April 1, 1958 — W. P. CRAWFORD — 2,829,024
CONVEYOR TYPE STORAGE CABINET
Filed Aug. 31, 1955 — 4 Sheets-Sheet 1
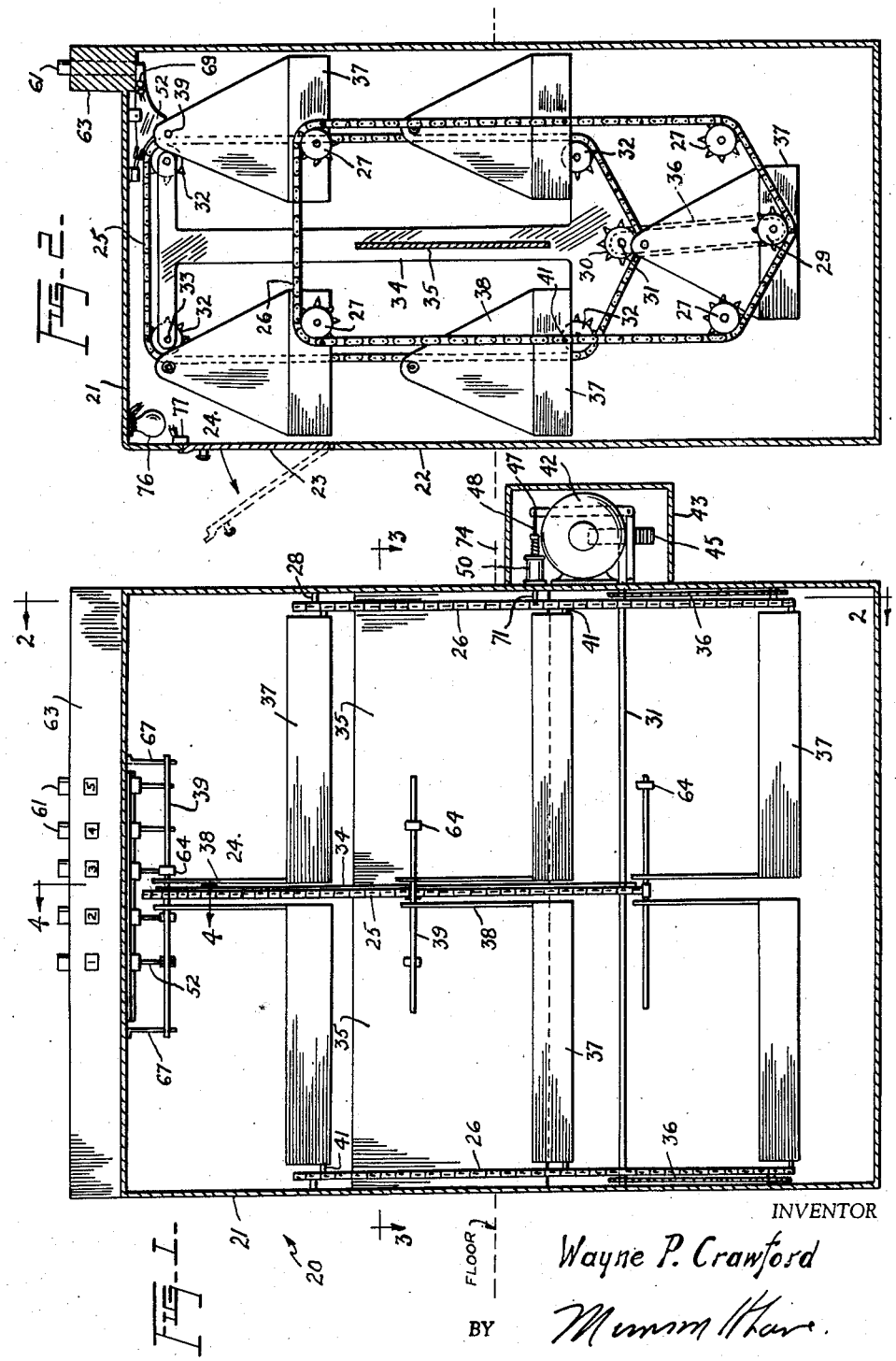
INVENTOR
Wayne P. Crawford
BY
ATTORNEY April 1, 1958 W. P. CRAWFORD 2,829,024
CONVEYOR TYPE STORAGE CABINET
Filed Aug. 31, 1955 4 Sheets-Sheet 2
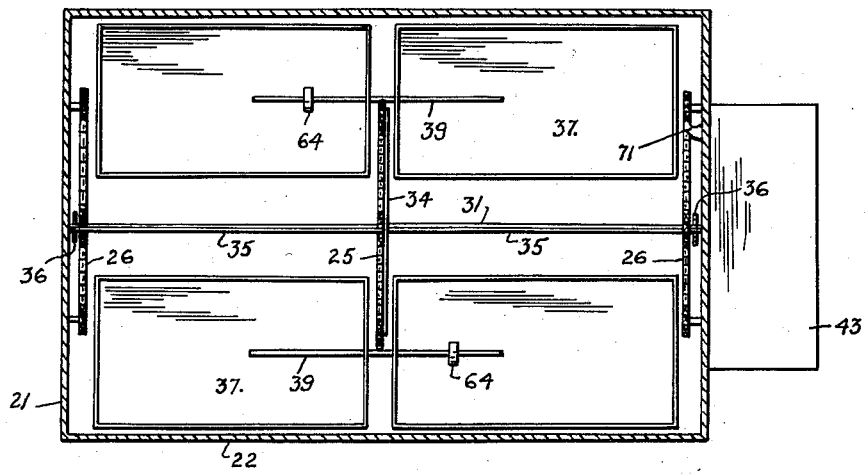
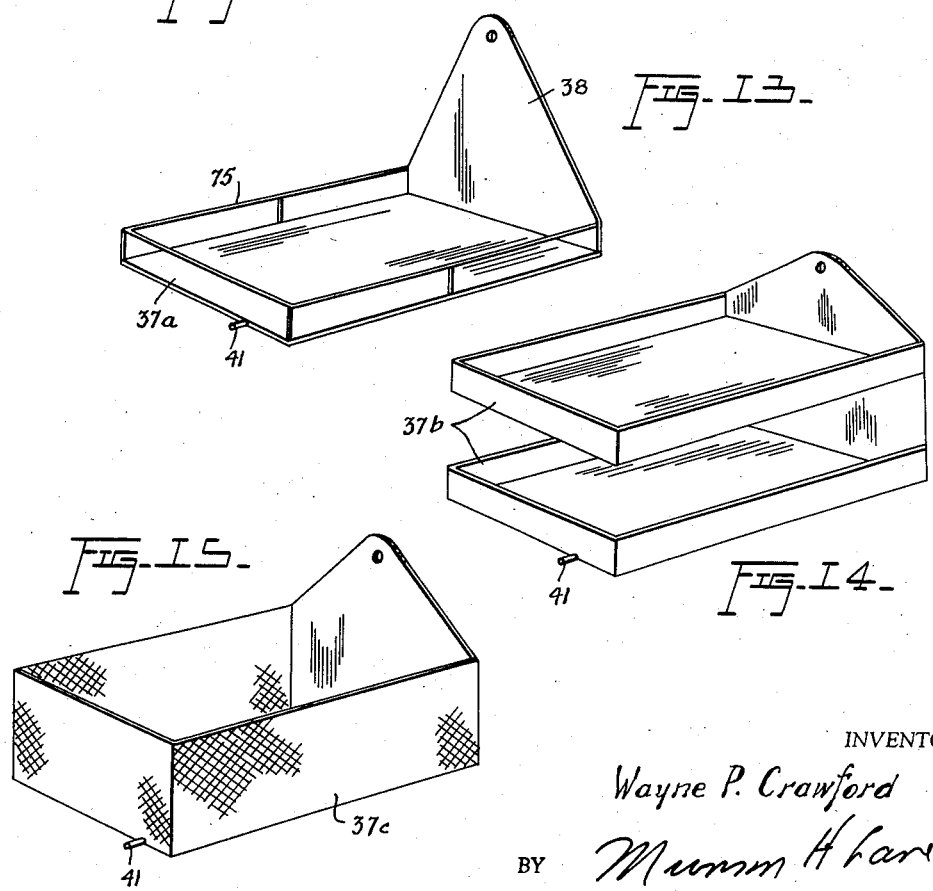
INVENTOR
Wayne P. Crawford
BY
ATTORNEY April 1, 1958 W. P. CRAWFORD 2,829,024
CONVEYOR TYPE STORAGE CABINET
Filed Aug. 31, 1955 4 Sheets-Sheet 3
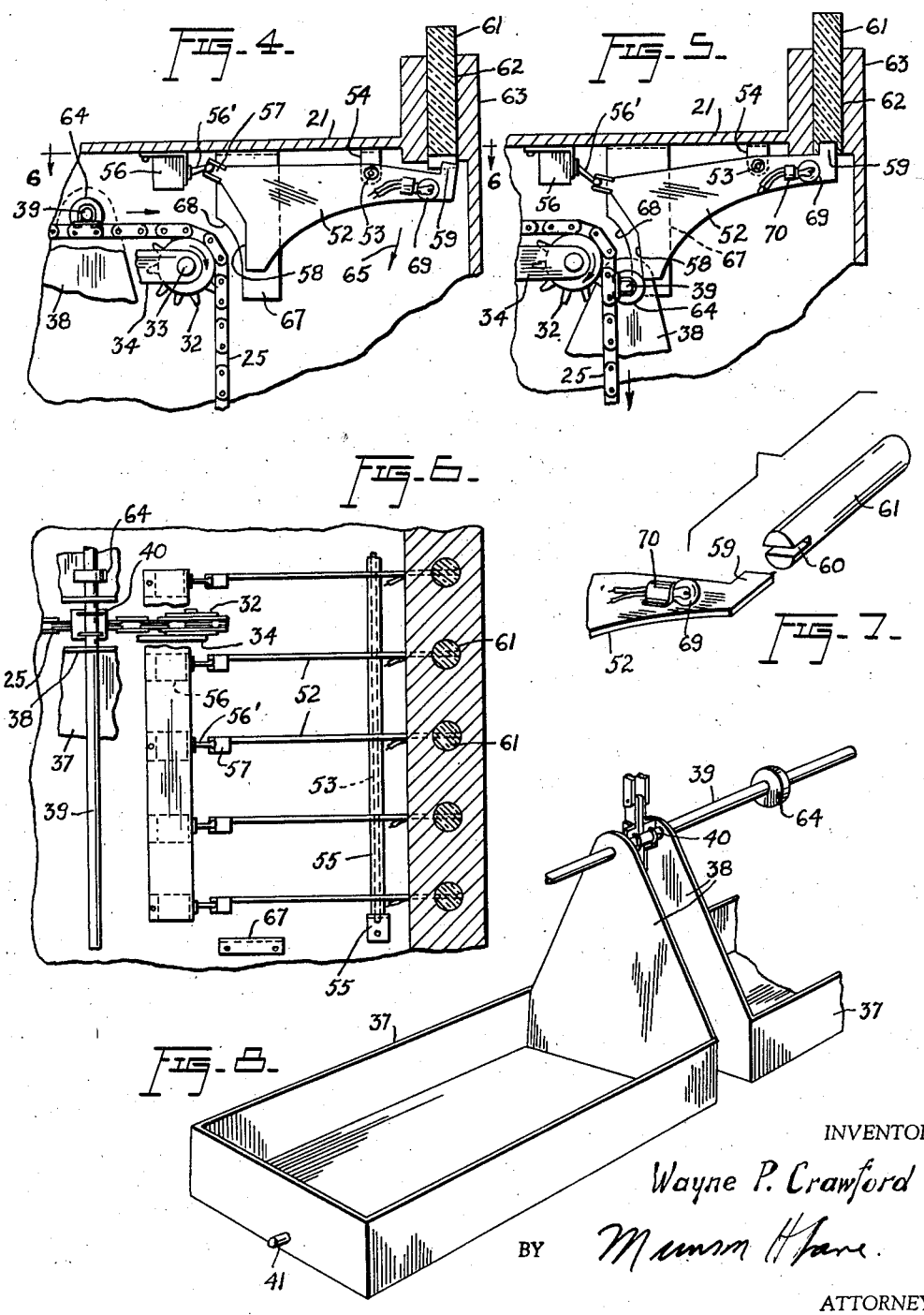
INVENTOR
Wayne P. Crawford
BY
ATTORNEY April 1, 1958 — W. P. CRAWFORD — 2,829,024
CONVEYOR TYPE STORAGE CABINET
Filed Aug. 31, 1955 — 4 Sheets-Sheet 4
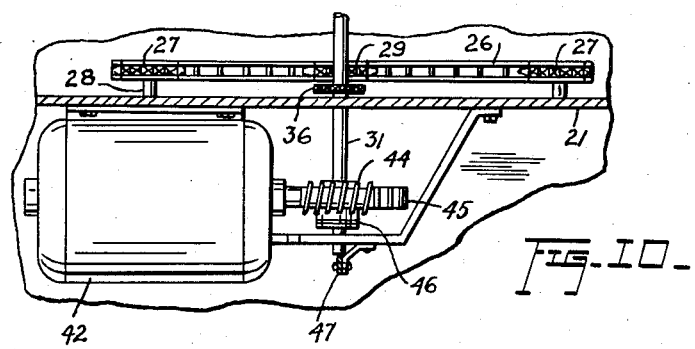
Fig. 10
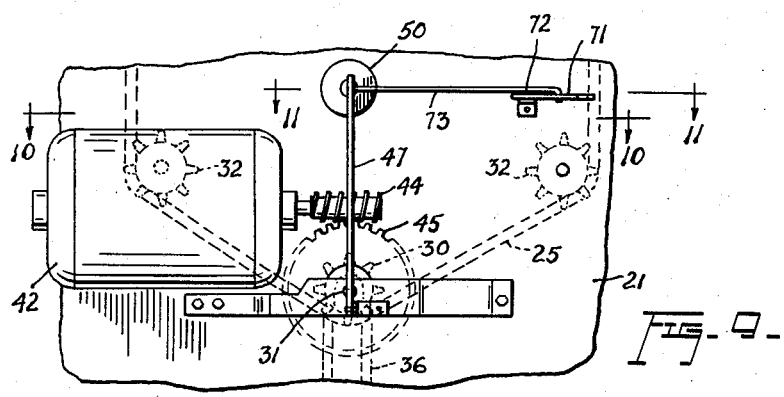
Fig. 9
Fig. 11
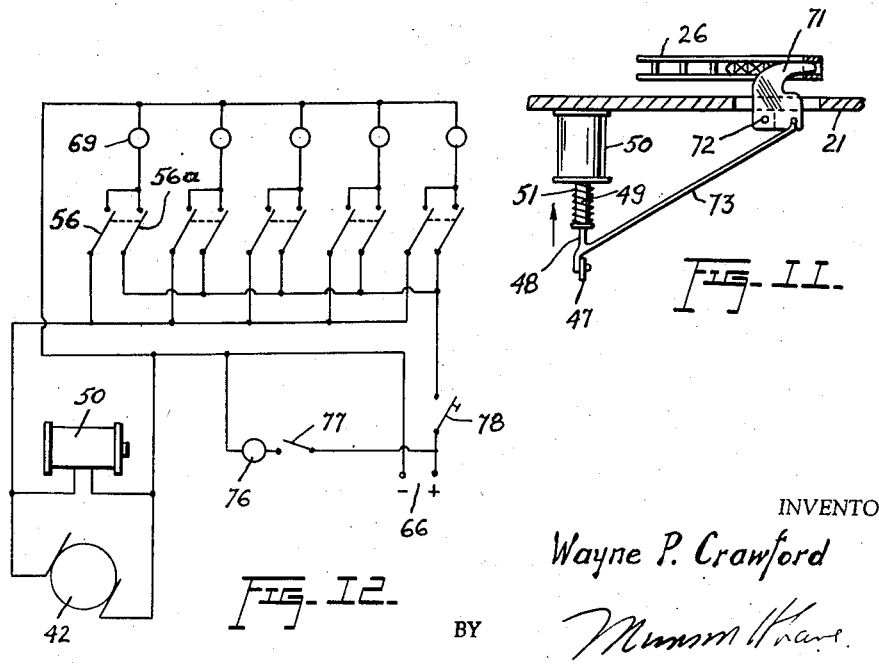
Fig. 12
INVENTOR
Wayne P. Crawford
BY
ATTORNEY

United States Patent Office 2,829,024
Patented Apr. 1, 1958

2,829,024

CONVEYOR TYPE STORAGE CABINET

Wayne P. Crawford, Hamilton, Ohio

Application August 31, 1955, Serial No. 531,727

8 Claims. (Cl. 312—268)

This invention relates to new and useful improvements and structural refinements in storage cabinets and in particular the invention concerns itself with a storage cabinet structure wherein a plurality of suitable trays or similar article carriers are movably supported by a set of endless chains in such manner that the trays may be brought selectively and individually in register with an article loading and unloading station.

The principal object of the invention is to afford a substantial conservation of space and facilitate convenient and expeditious access to the material being stored. Primarily, the invention is intended to be used in home kitchens, or the like, in the nature of a pantry with conveyor mounted shelves, although it is to be understood that the use of the invention is by no means limited to this particular environment. As such, the cabinet constructed in accordance with the invention may be vertically elongated and extended through the floor, so that only a relatively small upper end portion thereof is unobtrusively disposed in the kitchen while the relatively large lower portion thereof is located in the basement. The article loading and unloading station, disposed at the upper end of the cabinet, is readily accessible from the kitchen and the conveyor mounted trays or shelves in the entire cabinet may be quickly and easily brought in register therewith.

An important feature of the invention resides in an arrangement of the conveyor chains and trays so that a pair of trays, disposed side by side, may be brought in register with the loading and unloading station at the same time.

Another important feature of the invention resides in the provision of means for preventing rocking or swinging of the trays on the chains. Another feature of the invention involves the provision of a selective control mechanism for energizing the conveyor chains and automatically stopping the same when a predetermined tray is brought in register with the loading and unloading station.

Still another feature of the invention resides in the provision of means for positively locking the chains against movement when a tray is in position at the loading and unloading station.

Some of the advantages of the invention reside in its simplicity of construction, efficient and dependable operation, in its space saving characteristics and in its adaptability to economical manufacture.

With the foregoing more important objects and features in view and such other objects and features as may become apparent as this specification proceeds, the invention resides in the arrangement of parts and details of construction substantially as shown in the accompanying drawings, wherein like characters of reference are used to designate like parts and wherein:

Figure 1 is a front elevational view of the invention with the front wall of the cabinet removed to reveal the interior;

Figure 2 is a cross-sectional view, taken substantially in the plane of the line 2—2 in Figure 1;

Figure 3 is a horizontal sectional view, taken substantially in the plane of the line 3—3 in Figure 1;

Figure 4 is an enlarged sectional detail of the control mechanism, taken substantially in the plane of the line 4—4 in Figure 1, and showing the operating element depressed;

Figure 5 is a sectional detail, similar to that shown in Figure 4 but with the operating element and control member cleared by the contact member of the tray;

Figure 6 is a sectional view, taken substantially in the plane of the line 6—6 in Figure 4;

Figure 7 is a perspective view showing one of the operating elements and a portion of the associated control member;

Figure 8 is a fragmentary perspective view of one of the tray units;

Figure 9 is a fragmentary elevational view of the motor and drive;

Figure 10 is a sectional detail, taken substantially in the plane of the line 10—10 in Figure 9;

Figure 11 is a sectional detail, taken substantially in the plane of the line 11—11 in Figure 9;

Figure 12 is a wiring diagram of the electrical components of the invention; and Figures 13–15 are perspective views showing various modified forms of tray construction.

Referring now to the accompanying drawings in detail, the conveyor type storage cabinet is designated generally by the reference numeral 20 and embodies in its construction a suitable vertically elongated housing 21 having a front wall 22 provided adjacent the upper end thereof with a suitable door 23 for gaining access to a loading and unloading station 24 in the front upper portion of the housing.

A set of endless chains, namely, a center chain 25 and a pair of side chains 26, are disposed in transversely spaced vertical planes in the housing 21, it being observed in Figure 2 that the upper and lower runs of the center chain 25 are spaced upwardly from the respective upper and lower runs of the side chains 26. The side chains 26 are entrained over idler sprockets 27 mounted on stub shafts 28 on the side walls of the housing and the lower runs of these chains also pass around drive sprockets 29.

The center chain 25 passes around a drive sprocket 30 mounted upon a drive shaft 31 extending transversely of the housing, and is entrained over idler sprockets 32 on stub shafts 33 carried by a substantially I-shaped frame member 34 disposed vertically in the center portion of the housing at one side of the chain 25. The frame member 34 is connected to the side walls of the housing by transversely extending support plates 35. The three chains are driven in unison by sprocket chain drives 36 extending at both sides of the housing from the drive shaft 31 to the aforementioned sprockets 29.

A plurality of trays or other similar article carriers 37, arranged side by side in pairs, extend between the center chain 25 and the respective side chains 26 as is best shown in Figure 1, these trays being provided at one end thereof with an upstanding wall 38 while a transversely extending bar 39 passes through and is secured to the upstanding walls of the two trays in each pair, as illustrated in Figure 8 and rigidly secures the trays in each pair together. The intermediate portion of the bar 39 between the walls 38 is secured by suitable clamps and brackets 40 to the center chain 25. The other ends of the trays 37 are attached by suitable pins or trunnions 41 to the respective side chains 26 and since the vertical distance between the pins 41 and the bar 39 corresponds to the vertical spacing between the respective upper and lower runs of the chains 25, 26, it will be noted that as the trays are carried by the chains always in an upright position.

It will be also understood that the housing 21 may be vertically lengthened and the chains proportionately extended so as to accommodate any desired number of trays.

The chains 25, 26 are driven by an electric motor 42 mounted in a casing 43 at one side of the housing 21, the armature of the motor carrying a worm 44 which meshes with a gear 45 secured through the medium of a suitable clutch 46 to the aforementioned drive shaft 31. The clutch 46 is engaged and disengaged by means of a pivoted lever 47 which, in turn, is operatively connected by a link 48 to the armature 49 of a solenoid 50, the armature 49 carrying a spring 51 which urges the same and the associated lever 47 to a position wherein the clutch is disengaged. The solenoid 50 and the motor 42 are connected in parallel, as shown in the wiring diagram of Figure 12.

When the clutch is engaged and the motor energized, rotation of the shaft 31 will impart movement to the chains 25, 26 and, as a result, the trays 37 will travel along a substantially oval path within the cabinet housing 21 and the pairs of juxtaposed trays will be brought successively in register with the loading and unloading station 24. Selective control means are provided for starting and stopping the motor 42 so that any predetermined pair of trays may be selectively brought to position at the loading and unloading station. These means comprise a plurality of plate-shaped control members 52 which are mounted for rocking movement upon a common shaft 53 held in brackets 54 at the underside of the top wall of the housing 21, tubular spacers 55 being provided on the shaft 53 between the members 52, as shown. A plurality of double pole switches 56 are also secured to the underside of the top wall of the housing and have the operating levers 56' thereof operatively engaged in channel-shaped sockets 57 provided on the respective members 52.

The members 52 also have cam edges 58 hereinafter more fully mentioned, and upwardly projecting tongues 59 seated in kerfs 60 at the lower ends of a plurality of cylindrical, manually operable control elements 61. The latter are slidably mounted in vertical bores 62 formed in a back member 63 of the housing 21 and are preferably made from translucent material for a purpose hereinafter described.

The aforementioned cross bar 39 of each pair of trays 37 is provided with a disc-shaped contact member 64, these members on the cross bars of the several pairs of trays being transversely staggered and each adapted to operatively engage the cam edge 58 of one of the control members 52 when the associated tray unit is at the loading and unloading station 24. The control members 52 are so positioned that when they are rocked in the direction of the arrow 65 by manually depressing the control elements 61, the cam edges 58 are in the path of the contact members 64 and, at the same time, the switches 56 are closed.

As shown in Figure 12, the several switches 56 are connected together in parallel and in series with the motor 42 and solenoid 50 to a suitable source of current 66. Thus, when any one of the control elements 61 is depressed, the corresponding of the switches 56 is closed through the medium of the associated control member 52 and, at the same time, the cam edge 58 of that control member is projected into the path of the corresponding contact member 64 of the tray unit which corresponds to the particular control element 61 which was depressed. With the closing of any one of the switches 56 the motor 42 and solenoid 50 are energized so that drive is transmitted to the chains, and the several tray units continue to travel along their oval path within the housing 21 until the particular tray unit corresponding to the depressed control element reaches the position at the loading and unloading station 24.

When that occurs, the contact member 64 of that tray unit will come in engagement with the cam edge 58 of the depressed control member 52 and will force the same out of the way, back to its initial position as shown in Figure 5, wherein the associated switch 56 is again opened, the associated element 61 raised, and the motor drive to the chains stopped. The apparatus will then remain at rest until the next cycle of operation when another of the elements 61 is depressed.

It will be understood, of course, that the contact members 64 on the cross bars 39 of the several tray units are mutually transversely spaced and in alignment with the cam edges 58 of the respective control members 52, so that only that control member which has been depressed by the element 61 can operate to intercept the contact member of the corresponding tray unit. In that manner, once the tray units are set in motion by depressing one of the control elements 61, they will continue to move until the predetermined tray unit corresponding to the depressed control element is in position at the station 24.

In order to prevent the cross bars 39 and the associated tray units from twisting or becoming otherwise displaced while the contact members 64 thereof press against the cam edges 58 of the control members 52, a pair of plate-shaped guides 67 are provided at the underside of the top wall of the housing and disposed adjacent the ends of the bars 39, so that as these bars travel along their path and the members 64 contact the cam edges 58, the end portions of each bar supportably engage arcuate edges 68 of the guides 67 and prevent the bars from being displaced.

Signal means are provided for indicating which one of the control elements 61 has been depressed, these means comprising a plurality of lamps 69 mounted in sockets 70 at one side of the respective control members 52 and connected to the second poles 56a of the respective switches 56, as shown in Figure 12. The lamp 69 of each member 52 is disposed adjacent the tongue 59 and adjacent the base of the associated control element 61, and when the associated switch 56, 56a is closed by depressing the element 61, the lamp becomes energized and its light is transmitted through the translucent material of the element 61 to illuminate the same and afford the desired signal means. Since the lamps 69 are disposed between the several members 52 as is best shown in Figure 6, they are effectively shielded against lateral dispersion of light, so that any one of the lamps can illuminate only the associated control element.

Means are also provided for positively locking the chains 25, 26 against movement when any one of the tray units 37 is in position at the loading and unloading station 24. These means comprise a locking dog 71 pivoted at 72 to the housing 21 and operatively connected by an extension 73 of the aforementioned link 48 to the armature 49 of the solenoid 50. When the solenoid is energized and the chains are driven by the motor 42, the dog 71 is retracted, but when the motor is stationary and the solenoid inactive, the dog 71 is swung by the link 73 so that it projects into the links of the adjacent chain 26 and effectively locks the same against movement when a tray unit is in position at the loading and unloading station. This is best illustrated in the accompanying Figure 11.

As already stated the housing 21 may be lengthened vertically to accommodate any desired number of tray units and may be extended through a floor 74, such as for example, from the kitchen to the basement.

Various types of trays may also be used to suit various kinds of articles or material to be carried thereby, the box-shaped type of tray 37 shown in Figure 8 being one example. Alternatively, as shown in Figure 13, the tray may be relatively flat as shown at 37a and provided with a marginal rail 75, or a double decked tray 37b may be used, as shown in Figure 14. Also, a basket-type tray 37c formed from wire may be employed, as illustrated in Figure 15.

The loading and unloading station 24 is preferably illuminated by a lamp 76 in the upper portion of the housing 21, this lamp being controlled automatically by a switch 77 actuated by the door 23. A master control switch 78 is also provided in the circuit, as shown in Figure 12.

While in the foregoing there has been shown and described the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claims.

What is claimed as new is:

1. In a conveyor type storage cabinet, the combination of an elongated housing having a door opening constituting a loading and unloading station, a set of endless chains disposed in spaced vertical planes in said housing, a plurality of trays carried by said chains, an electric motor operatively connected to said chains for driving the same and bringing said trays individually and successively in register with said station, a plurality of transversely spaced selector control members rockably mounted in said housing, a plurality of parallel connected switches in series with said motor and operatively connected to the respective control members, a plurality of manually depressible operating elements provided on said housing and operatively connected to the respective control members for actuating said switches to energize said motor, transverse bars carried by said trays, and contact members provided at transversely spaced points on the respective bars, said control members having cam edges projectable into the path of said contact members when said operating elements are depressed, whereby said contact members are engageable with said cam edges to return the respective control members to their initial position when the respective trays are in register with said station.

2. The structure as defined in claim 1 together with a plurality of signal lamps carried by the respective control members for illuminating the respective operating elements, said lamps being in circuit with the respective switches and individually energized when the respective operating elements are depressed.

3. The structure as defined in claim 1 wherein the operative connection of said motor to said chains includes a clutch, together with a solenoid for actuating said clutch, said solenoid being in parallel circuit with said motor and in series with said switches.

4. The structure as defined in claim 3 together with means operatively connected to said solenoid for positively locking said chains against movement when a tray is in register with said station.

5. In a conveyor type storage cabinet, the combination of a housing including a pair of side walls and a front wall provided with a door opening, a center endless chain and a pair of side endless chains disposed in spaced vertical planes in said housing, sprockets rotatably mounted on said side walls for supporting said side chains, a substantially I-shaped frame member coplanar with and disposed within said center chain, sprockets rotatably mounted on said frame member for supporting the center chain, a pair of vertically disposed support plates extending from opposite sides of said frame member to the respective side walls for supporting the frame member in the housing, said center chain having upper and lower runs spaced above the respective upper and lower runs of said side chains, two horizontally juxtaposed sets of trays extending between the center chain and the respective side chains, and trunnions provided at opposite ends of said trays for attaching the same to the center chain and to the respective side chains at points spaced vertically by a distance equal to the spacing of said runs of the chains whereby the trays carried by the chains are prevented from swinging, said support plates being encompassed by said side chains with such clearance as to prevent interference of said trays therewith.

6. The structure as defined in claim 5 wherein each of said trays includes a bottom and an upstanding wall provided at one end of said bottom, one of said trunnions being provided at the other end of said bottom for attachment to one of said side chains and another of said trunnions being provided on the upper portion of said upstanding wall for attachment to said center chain.

7. In a conveyor type storage cabinet, the combination of a center endless chain and a pair of side endless chains disposed in spaced vertical planes, said center chain having upper and lower runs spaced vertically from the respective upper and lower runs of the side chains, pairs of trays extending between the center chain and the side chains, means provided at the outer ends of said trays and attaching the same to the side chains, and means rigidly connecting together the inner ends of the trays and attaching the same to the center chain at points spaced vertically from said first mentioned means by a distance equal to the vertical spacing of said runs of chains, whereby to provide a three-point suspension for each pair of trays and prevent the trays from swinging.

8. In a conveyor type storage cabinet, the combination of a center endless chain and a pair of side endless chains disposed in spaced vertical planes, said center chain having upper and lower runs spaced vertically from the respective upper and lower runs of the side chains, and a horizontally elongated rigid tray member suspended from said chains, said tray member comprising a pair of juxtaposed tray sections, coaxial trunnions provided at the outer ends of said tray sections, upstanding wall provided at the inner ends of the tray sections and spaced from each other, and a bar connected to said walls at a point spaced vertically from said trunnions and rigidly securing the tray sections together, said trunnions being attached to said side chains and said bar being attached to said center chain, whereby to provide a three-point suspension for said tray member and prevent the same from swinging.

References Cited in the file of this patent

UNITED STATES PATENTS

| | | |
|---|---|---|
| 920,538 | Cannon | May 4, 1909 |
| 971,423 | Walters | Sept. 27, 1910 |
| 1,905,230 | James et al. | Apr. 25, 1933 |
| 1,952,393 | Tigue | Mar. 27, 1934 |
| 2,397,092 | Drexler | Mar. 26, 1946 |
| 2,640,144 | Levy | May 26, 1953 |
| 2,673,779 | Stewart et al. | Mar. 30, 1954 |